US010452483B2

(12) United States Patent
Komatsu

(10) Patent No.: US 10,452,483 B2
(45) Date of Patent: Oct. 22, 2019

(54) AUTOMATIC BACKUP DEVICE, AUTOMATIC BACKUP METHOD, AND RECORDING MEDIUM

(71) Applicant: FANUC CORPORATION, Minamitsuru-gun, Yamanashi (JP)

(72) Inventor: Takaaki Komatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/660,138

(22) Filed: Jul. 26, 2017

(65) Prior Publication Data
US 2018/0032404 A1  Feb. 1, 2018

(30) Foreign Application Priority Data

Jul. 29, 2016  (JP) .................................. 2016-150387

(51) Int. Cl.
*G06F 11/00*  (2006.01)
*G06F 11/14*  (2006.01)

(52) U.S. Cl.
CPC ...... *G06F 11/1448* (2013.01); *G06F 11/1458* (2013.01); *G06F 11/1469* (2013.01); *G06F 11/1456* (2013.01); *G06F 2201/875* (2013.01)

(58) Field of Classification Search
CPC ............. G06F 11/1448; G06F 11/1456; G06F 11/1458; G06F 11/1469; G06F 11/1446;
(Continued)

(56) References Cited

U.S. PATENT DOCUMENTS 5,559,991 A * 9/1996 Kanfi ...................... G06F 11/08
707/999.202
6,381,512 B1 * 4/2002 Saitou ..................... B29C 45/76
700/200
(Continued)

FOREIGN PATENT DOCUMENTS

CN  101106480  1/2008
CN  102411523  4/2012
(Continued)

OTHER PUBLICATIONS

Notification of Reasons for Refusal dated May 15, 2018 in corresponding Japanese Application No. 2016-150387 (with English translation).

*Primary Examiner* — Anthony J Amoroso
(74) *Attorney, Agent, or Firm* — Wenderoth, Lind & Ponack, L.L.P.

(57) ABSTRACT

To allow restoration of a backup target device more properly. An automatic backup device comprises: a history information acquisition unit that acquires history information containing a time of a change in setting on a backup target device and a content of the change associated with each other; a restoration request acquisition unit that acquires a restoration request containing a time intended for restoration of the backup target device; a restoration information generation unit that generates restoration information for restoring the backup target device based on the time contained in the restoration request by using the history information acquired by the history information acquisition unit; and a restoration information transmission unit that transmits the restoration information generated by the restoration information generation unit to the backup target device.

14 Claims, 21 Drawing Sheets

(58) Field of Classification Search
CPC ........... G06F 11/1451; G06F 2201/875; G06F 11/1471
See application file for complete search history.

(56) References Cited

U.S. PATENT DOCUMENTS

| | | | |
|---|---|---|---|
| 7,409,414 B2 * | 8/2008 | Okada | G06F 11/1471 707/648 |
| 8,055,628 B2 * | 11/2011 | Margolus | G06F 16/2358 707/663 |
| 2007/0180000 A1 | 8/2007 | Mine et al. | |

FOREIGN PATENT DOCUMENTS

| CN | 105144005 | 12/2015 |
|---|---|---|
| JP | 5-143136 | 6/1993 |
| JP | 11-333899 | 12/1999 |
| JP | 2007-140700 | 6/2007 |
| JP | 4151402 | 9/2008 |
| JP | 4269533 | 5/2009 |
| JP | 2014-142852 | 8/2014 |
| WO | 2014/115314 | 7/2014 |
| WO | 2015/181937 | 12/2015 |

\* cited by examiner

FIG. 6

| Date and time | Location of change | Value before change | Value after change |
|---|---|---|---|
| 2016/01/01 00:00:00.00 | Backup | State as of the time of shipment (Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC (Parameter and program entirely) | |
| 2016/06/02 09:05:56.96 | Parameter #314 | 1592 | 6535 |

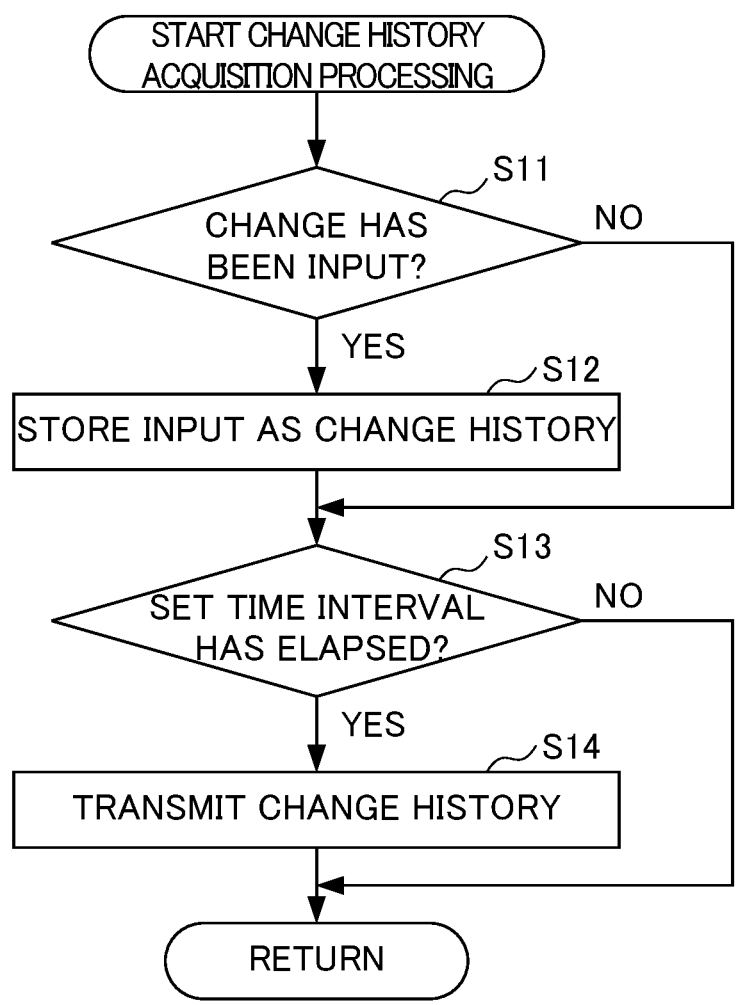

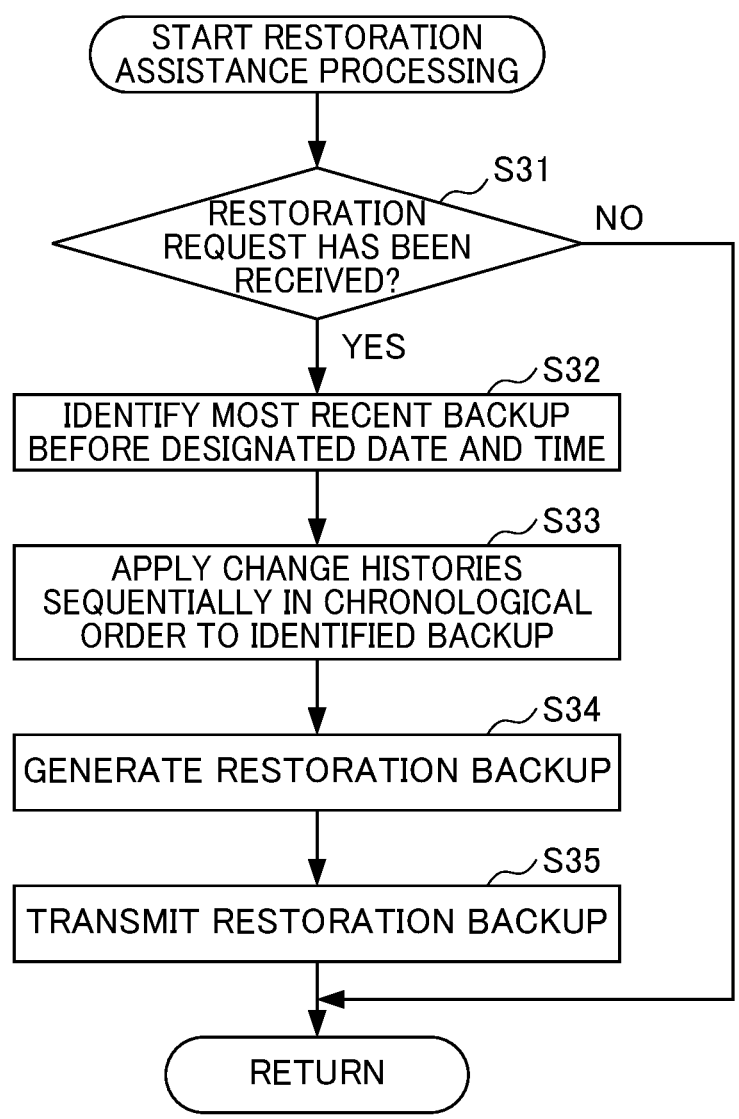

FIG. 10

| Date and time | Location of change | Value before change | Value after change |
|---|---|---|---|
| 2016/01/01 00:00:00.00 | Backup | State as of the time of shipment (Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC (Parameter and program entirely) | |
| 2016/06/02 09:05:56.96 | Parameter #314 | 1592 | 6535 |

Designate date and time →

FIG. 11

| Date and time | Location of change | Value before change | Value after change |
|---|---|---|---|
| 2016/01/01 00:00:00.00 | Backup | State as of the time of shipment (Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC (Parameter and program entirely) | |
| 2016/06/02 09:05:56.96 | Parameter #314 | 1592 | 6535 |

Identify backup 

Designate date and time 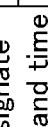

FIG. 12

| Date and time | Location of change | Value before change | Value after change |
|---|---|---|---|
| 2016/01/01 00:00:00.00 | Backup | State as of the time of shipment(Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC(Parameter and program entirely) | |
| 2016/06/02 09:05:56.96 | Parameter #314 | 1592 | 6535 |

Apply change histories sequentially

Designated date and time

FIG. 14

| Date and time | Location of change | Value before change | Value after change |
|---|---|---|---|
| 2016/01/01 00:00:00.00 | Backup | | State as of the time of shipment(Parameter and program entirely) |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | | State of CNC(Parameter and program entirely) |
| 2016/06/02 09:05:56.96 | Parameter #314 | 1592 | 6535 |

Designated date and time

Recover change histories to their states sequentially before being changed

Identify backup

FIG. 15

History information

| Date and time | Location of change | Value before change | Value after change |
|---|---|---|---|
| 2016/01/01 00:00:00.00 | Backup | State as of the time of shipment(Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC(Parameter and program entirely) | |
| 2016/06/02 09:05:56.96 | Parameter #314 | 1592 | 6535 |

Newly received change history

Not match

| 2016/06/02 11:48:23:16 | Parameter #314 | 8979 | 3238 |

FIG. 16

| | Date and time | Location of change | Value before change | Value after change |
|---|---|---|---|---|
| History information | 2016/01/01 00:00:00.00 | Backup | State as of the time of shipment (Parameter and program entirely) | |
| | 2016/05/31 17:10:00.00 | User program O0100 entirely | (No) | O0100 entirely |
| | 2016/05/31 17:10:00.04 | User program O0102 entirely | (No) | O0102 entirely |
| | 2016/06/01 09:52:35.24 | Insertion of User program O0100 line 3776 | (No) | G01 X577 Y577 Z577 |
| | 2016/06/01 09:52:37.00 | Replacement of User program O0100 line 5 col 3 | X100 | X577 |
| | 2016/06/01 09:52:46.20 | User program O0102 entirely | O0102 entirely | (Deletion) |
| | 2016/06/01 09:53:11.46 | Parameter #12345 | 67 | 89 |
| | 2016/06/01 09:53:11.61 | Parameter #98765 | 43 | 21 |
| | 2016/06/01 10:05:56.84 | System software basic001.bin | (Ver 4.00a) | (Ver 4.30c) |
| | 2016/06/01 10:05:56.88 | System software basic002.bin | (Ver 2.10e) | (Ver 2.20a) |
| | 2016/06/01 10:05:56.92 | System software basic003.bin | (No) | (Ver 1.00b) |
| | 2016/06/02 00:00:00.00 | Backup | State of CNC (Parameter and program entirely) | |
| | 2016/06/02 09:05:56.96 | Parameter #314 | 1592 | 6535 |
| Interpolated for resolving | 2016/06/02 11:48:23.16 | Parameter #314 | 6535 | 8979 |
| | 2016/06/02 11:48:23.16 | Parameter #314 | 8979 | 3238 |

FIG. 17

| Date and time | Location of change | Value before change | Value after change |
|---|---|---|---|
| 2016/01/01 00:00:00.00 | Backup | | State as of the time of shipment(Parameter and program entirely) |
| 2016/05/31 17:10:00.00 | [Label]Program editing | | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:00.00 | System software update | | |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | | State of CNC(Parameter and program entirely) |
| 2016/06/02 09:05:56.96 | Parameter #314 | 1592 | 6535 |

FIG. 18

| Date and time | Location of change | Value before change | Value after change |
|---|---|---|---|
| 2016/01/01 00:00:00.00 | Backup | State as of the time of shipment(Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC(Parameter and program entirely) | |
| 2016/06/02 09:05:56.96 | Parameter #314 | 1592 | 6535 |

Apply change of the same content as that of designated change history

FIG. 19

| Date and time | Location of change | Value before change | Value after change |
|---|---|---|---|
| 2016/01/01 00:00:00.00 | Backup | State as of the time of shipment (Parameter and program entirely) | |
| 2016/05/31 17:10:00.00 | User program O0100 entirely | (No) | O0100 entirely |
| 2016/05/31 17:10:00.04 | User program O0102 entirely | (No) | O0102 entirely |
| 2016/06/01 09:52:35.24 | Insertion of User program O0100 line 3776 | (No) | G01 X577 Y577 Z577 |
| 2016/06/01 09:52:37.00 | Replacement of User program O0100 line 5 col 3 | X100 | X577 |
| 2016/06/01 09:52:46.20 | User program O0102 entirely | O0102 entirely | (Deletion) |
| 2016/06/01 09:53:11.46 | Parameter #12345 | 67 | 89 |
| 2016/06/01 09:53:11.61 | Parameter #98765 | 43 | 21 |
| 2016/06/01 10:05:56.84 | System software basic001.bin | (Ver 4.00a) | (Ver 4.30c) |
| 2016/06/01 10:05:56.88 | System software basic002.bin | (Ver 2.10e) | (Ver 2.20a) |
| 2016/06/01 10:05:56.92 | System software basic003.bin | (No) | (Ver 1.00b) |
| 2016/06/02 00:00:00.00 | Backup | State of CNC (Parameter and program entirely) | |
| 2016/06/02 09:05:56.96 | Parameter #314 | 1592 | 6535 |
| 2016/06/02 09:30:24.72 | User program O0102 entirely | (No) | O0102 entirely |

Add change of reverse content to that of change history to be canceled

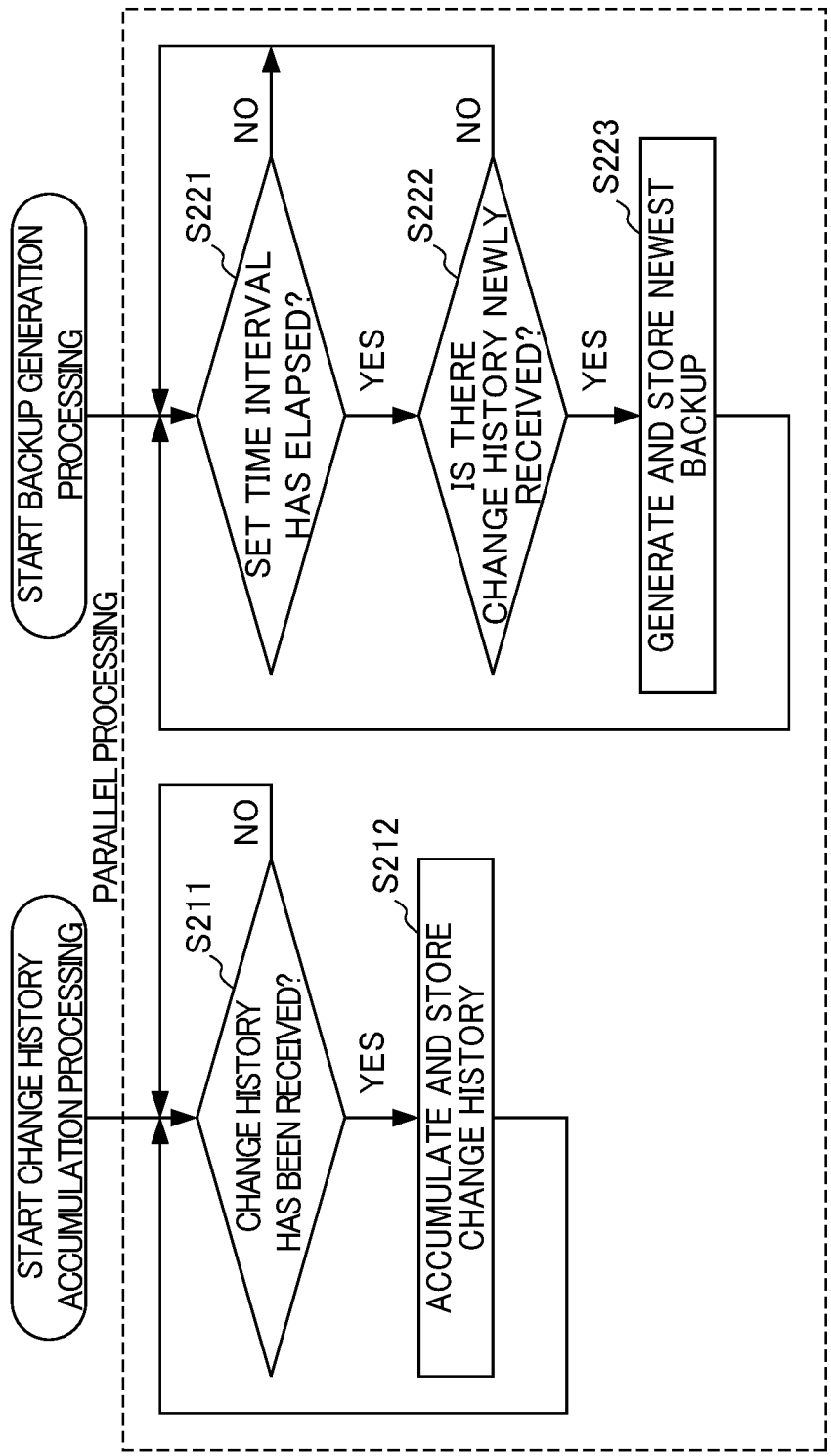

US 10,452,483 B2

AUTOMATIC BACKUP DEVICE, AUTOMATIC BACKUP METHOD, AND RECORDING MEDIUM

This application is based on and claims the benefit of priority from Japanese Patent Application No. 2016-150387, filed on 29 Jul. 2016, the content of which is incorporated herein by reference.

BACKGROUND OF THE INVENTION

Field of the Invention

The present invention relates to an automatic backup device, an automatic backup method, and recording medium storing a program for storing a history of a change in a backup target device automatically and allowing restoration of the backup target device to a state before the change.

Related Art

There has been a conventionally-known technique of backing up a history of a change in a parameter, a program, and the like of a target device such as a machine tool to be controlled by computer numerical control (CNC). For example, patent document 1 discloses a file editing device that stores history information about a file containing character strings representing numerical control information. The history information to be stored includes a version name, an address of a change location, a deleted character string, and a newly added character string. Patent document 2 discloses a numerical controller that stores factual information about rewrite of a parameter of a numerical controller (CNC device) and a date and time of storage of the factual information together. This factual information is stored as history information indicating the fact that the parameter has been changed and indicating an address of the changed parameter. Patent document 3 discloses a numerical controller that stores rewrite history information A sequentially about a parameter of the numerical controller. The rewrite history information A to be stored contains an identification number of an operator responsible for rewrite, a date of the rewrite, an address of the parameter, and a value of the parameter after change.

Patent Document 1: Japanese Unexamined Patent Application, Publication No. H05-143136
Patent Document 2: Japanese Patent No. 4269533
Patent Document 3: Japanese Patent No. 4151402

SUMMARY OF THE INVENTION

The technique described in patent document 1 is to store a version name after change as the history information but is not to store a time of the change. Further, the change is stored manually. Hence, restoring a backup target device properly while tracing a change in the backup target device having been made in the past is difficult by using only the information stored as the history information. According to the technique described in patent document 2, the content of the changed parameter is not stored. Hence, restoring a backup target device properly while tracing a change in the backup target device having been made in the past is difficult by using only the history information described in patent document 2. According to the technique described in patent document 3, a time of a change in the parameter and a value of the parameter before the change are not stored. Hence, restoring a backup target device properly while tracing a change in the backup target device having been made in the past is difficult by using only the rewrite history information A described in patent document 3.

It is an object of the present invention to allow restoration of a backup target device more properly.

(1) In order to achieve the above-described object, an automatic backup device (automatic backup device 200 described later, for example) according to an aspect of the present invention comprises: a history information acquisition unit (change history receiving unit 211a described later, for example) that acquires history information containing a time of a change in setting on a backup target device (numerical controller 100 described later, for example) and a content of the change associated with each other; a restoration request acquisition unit (restoration request receiving unit 211c described later, for example) that acquires a restoration request containing a time intended for restoration of the backup target device; a restoration information generation unit (restoration backup generation unit 211d described later, for example) that generates restoration information for restoring the backup target device based on the time contained in the restoration request by using the history information acquired by the history information acquisition unit; and a restoration information transmission unit (restoration backup transmission unit 211e described later, for example) that transmits the restoration information generated by the restoration information generation unit to the backup target device.

(2) The automatic backup device according to (1) may comprise a history information storage unit (history information storage unit 216a described later, for example) in which the history information acquired by the history information acquisition unit is accumulated and stored.

(3) The automatic backup device according to (1) or (2) may comprise a backup generation unit (automatic backup generation unit 211b described later, for example) that generates a backup containing a parameter and a program of the backup target device entirely based on the history information acquired by the history information acquisition unit. The backup generation unit may generate the backup at predetermined time intervals or each time the history information of a predetermined quantity is accumulated.

(4) In the automatic backup device according to any one of (1) to (3), the restoration information generation unit may generate a restoration backup as the restoration information based on the time contained in the restoration request by using the history information, the restoration backup containing a parameter and a program of the backup target device entirely as of the time contained in the restoration request.

(5) In the automatic backup device according to any one of (1) to (4), the restoration information generation unit may generate the restoration information by using a piece of the history information as a starting point as a basis older than a piece of the history information as of the time contained in the restoration request, and by applying pieces of the history information sequentially in chronological order in terms of a change in the setting, the applied pieces of the history information ranging to the time contained in the restoration request.

(6) In the automatic backup device according to any one of (1) to (4), the restoration information generation unit may generate the restoration information by using a piece of the history information as a starting point as a basis newer than a piece of the history information as of the time contained in the restoration request, and by recovering pieces of the history information sequentially in reverse chronological order in terms of a change in the setting to their states before being changed, the recovered pieces of the history information ranging to the time contained in the restoration request.

(7) In the automatic backup device according to any one of (1) to (6), if there is a contradiction in the history information, the restoration information generation unit may transmit the occurrence of the contradiction to the backup target device.

(8) In the automatic backup device according to any one of (1) to (7), if there is a contradiction in the history information, the restoration information generation unit may generate a change history to be interpolated for resolving the contradiction.

(9) In the automatic backup device according to any one of (1) to (8), the history information acquisition unit may add a label to the received history information for discrimination of the history information.

(10) In the automatic backup device according to any one of (1) to (9), if a particular change in the history information is to be canceled, the restoration information generation unit may add and apply a change having a reverse content to that of the particular change.

(11) In the automatic backup device according to (2), the history information storage unit may store a backup containing a parameter and a program of the backup target device entirely as of the time of shipment of the backup target device.

(13) An automatic backup method according to an aspect of the present invention comprises: a history information acquisition step of acquiring history information containing a time of a change in setting on a backup target device and a content of the change associated with each other; a restoration request acquisition step of acquiring a restoration request containing a time intended for restoration of the backup target device; a restoration information generation step of generating restoration information for restoring the backup target device based on the time contained in the restoration request by using the history information acquired by the history information acquisition step; and a restoration information transmission step of transmitting the restoration information generated by the restoration information generation step to the backup target device.

(14) A program according to an aspect of the present invention causes a computer to execute: a history information acquisition function of acquiring history information containing a time of a change in setting on a backup target device and a content of the change associated with each other; a restoration request acquisition function of acquiring a restoration request containing a time intended for restoration of the backup target device; a restoration information generation function of generating restoration information for restoring the backup target device based on the time contained in the restoration request by using the history information acquired by the history information acquisition function; and a restoration information transmission function of transmitting the restoration information generated by the restoration information generation function to the backup target device.

According to the present invention, a backup target device can be restored more properly.

BRIEF DESCRIPTION OF THE DRAWINGS

FIG. 6 is a schematic view showing an example of history information stored in a history information storage unit;

FIG. 7 is a flowchart showing a flow of change history acquisition processing executed by a CPU of the numerical controller;

FIG. 9 is a flowchart showing a flow of restoration assistance processing executed by the CPU of the automatic backup device;

FIG. 10 is a schematic view showing an example of a state where a date and time is designated in a restoration request;

FIG. 11 is a schematic view showing an example of a state where a backup is identified by the restoration assistance processing;

FIG. 12 is a schematic view showing a state where restoration is made to the date and time designated in the restoration request;

FIG. 14 schematically shows a procedure of generating a restoration backup by identifying a most recent backup after a date and time designated in a restoration request;

FIG. 15 schematically shows a state where there is a contradiction in the history information stored in the history information storage unit;

FIG. 16 is a schematic view showing a state where a change history for resolving the contradiction is interpolated;

FIG. 17 is a schematic view showing a state where a label is added to history information;

FIG. 18 is a schematic view showing a state where a change having the same content as that of a change history as of a particular date and time is applied to the numerical controller;

FIG. 19 is a schematic view showing a state where a change for canceling only a particular change history is applied;

FIG. 21 is a flowchart showing a flow of a procedure employed to execute processing of accumulating change histories (change history accumulation processing) and processing of generating a backup (backup generation processing) in parallel.

DETAILED DESCRIPTION OF THE INVENTION

Figure 1:
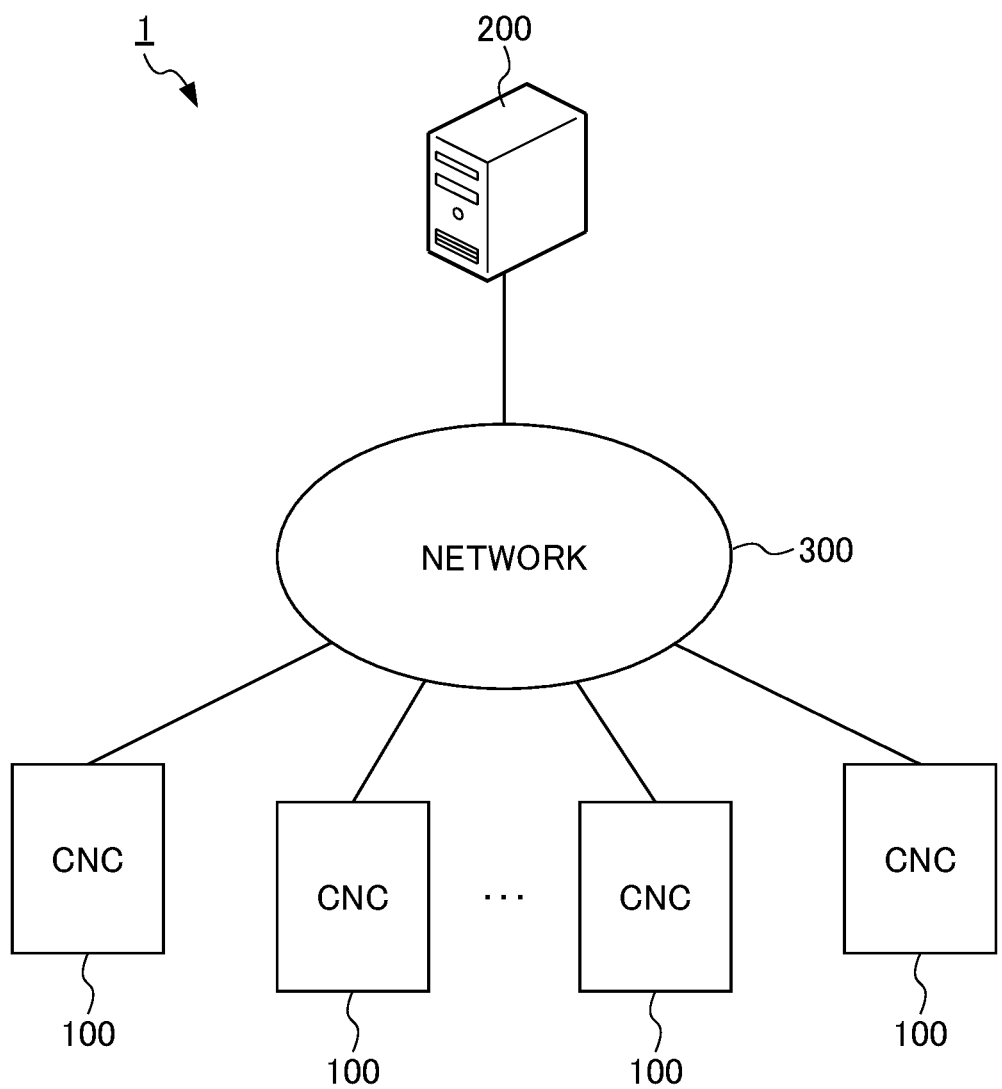
FIG. 1 is a schematic view showing the system configuration of an automatic backup system according to an embodiment of the present invention.

An embodiment of the present invention will be described below by referring to the drawings.

[Configuration]

FIG. 1 is a schematic view showing the system configuration of an automatic backup system 1 according to the embodiment of the present invention. As shown in FIG. 1, the automatic backup system 1 includes multiple numerical controllers (CNC devices) 100, and an automatic backup device 200. The multiple numerical controllers 100 and the automatic backup device 200 are configured in such a manner as to allow communication therebetween through a network 300 such as a local area network (LAN) or the Internet.

The numerical controller 100 controls a servo motor provided in a machine tool by following a set parameter and a set program. If an operator changes the set parameter or program, the numerical controller 100 temporarily stores a change history containing at least a date and time of the change, a location of the change, a value before the change, and a value after the change. The numerical controller 100 transmits the stored change history to the automatic backup device 200 at regular time intervals (once every second, for example). The numerical controller 100 accepts an input of a request (hereinafter called a "restoration request") for restoring the numerical controller 100 to a state as of a designated date and time by recovering a state of the parameter or that of the program before the change. The restoration request is input by the operator and contains designation as of the date and time to when the numerical controller 100 is to be restored. The numerical controller 100 transmits the input restoration request to the automatic backup device 200. The numerical controller 100 according to the present embodiment is shown as an example of a controller having a parameter or a program to be backed up. A controller to which the present invention can be applied includes a robot controller, for example, in addition to the numerical controller 100.

Figure 2:
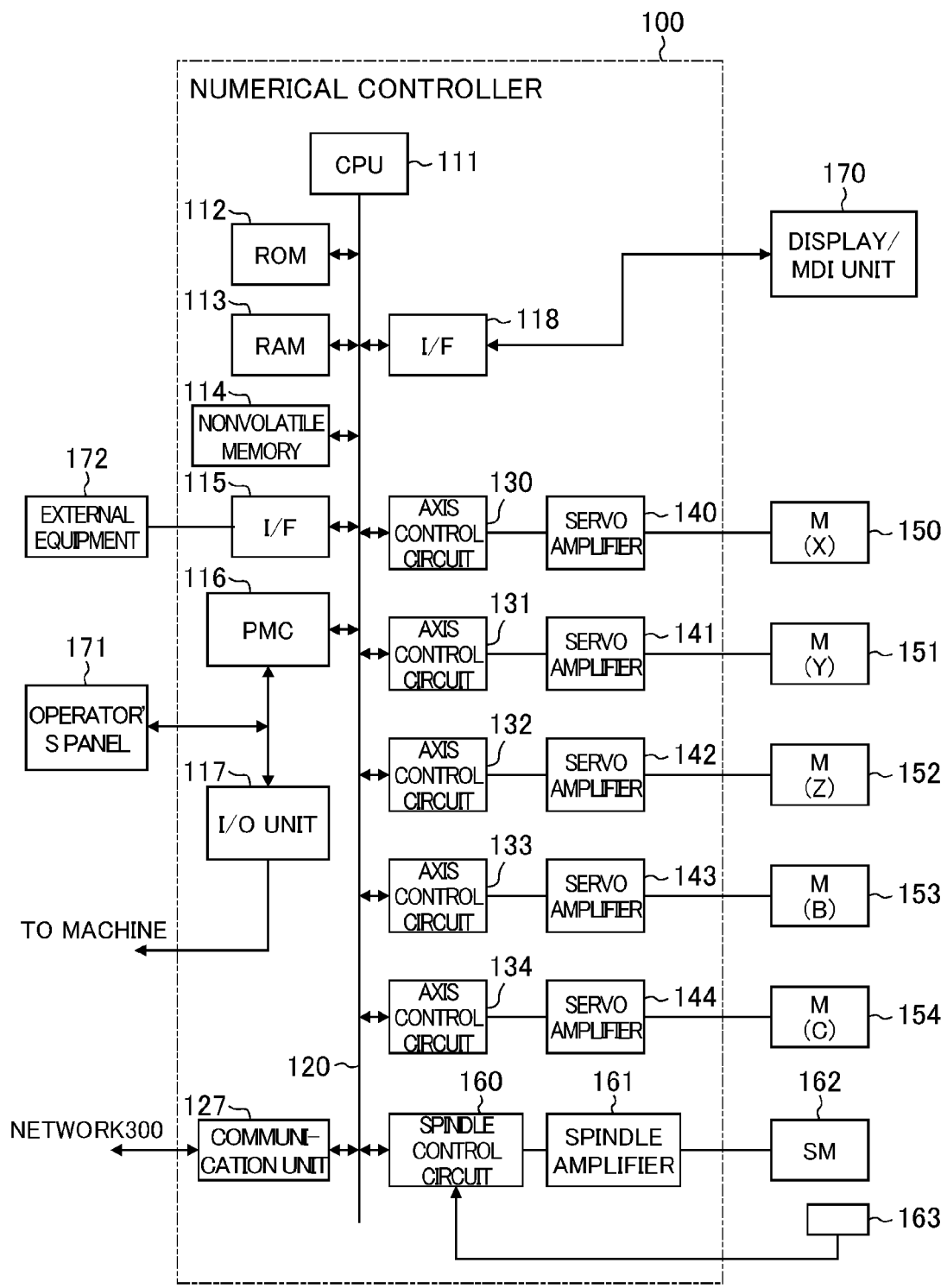
FIG. 2 is a block diagram showing the hardware configuration of a principal part of a numerical controller.

FIG. 2 is a block diagram showing the hardware configuration of a principal part of the numerical controller 100. The numerical controller 100 includes a CPU 111 as a processor that controls the numerical controller 100 entirely. The CPU 111 reads a system program from a ROM 112 through a bus 120 and controls the numerical controller 100 entirely by following the read system program. A RAM 113 stores temporary calculated data, display data, and various types of data input by an operator through a display/MDI unit 170. Generally, access is made faster to a RAM than to a ROM. Thus, the system program stored in the ROM 112 may be developed in advance on the RAM 113. Then, the CPU 111 may read the system program from the RAM 113 and execute the read system program. A nonvolatile memory 114 is a magnetic storage unit, a flash memory, an MRAM, FRAM (registered trademark), or an EEPROM. Alternatively, the nonvolatile memory 114 is an SRAM or a DRAM backed up by a battery not shown in the drawings. The nonvolatile memory 114 is configured as a nonvolatile memory to hold its storage state even after the numerical controller 100 is powered off. The nonvolatile memory 114 stores machining program and the like input through an interface 115, the display/MDI unit 170, or a communication unit 127.

The ROM 112 stores various system programs written in advance for executing processing in an edit mode required for generation and editing of the machining program and executing processing for automatic operation. Various machining programs can be input through the interface 115, the display/MDI unit 170, or the communication unit 127, and can be stored into the nonvolatile memory 114. The interface 115 is to allow connection between the numerical controller 100 and external equipment 172. A machining program, various parameters, and the like are read from the external equipment 172. A machining program edited in the numerical controller 100 can be stored into external storage means through the external equipment 172. Specific examples of the interface 115 include an RS232C interface, a USE, an SATA interface, a PC card slot, a CF card slot, an SD card slot, Ethernet (registered trademark), and Wi-Fi. The interface 115 can be located in the display/MDI unit 170. Examples of the external equipment 172 include a computer, a USB memory, a CFast card, a CF card, and an SD card.

A programmable machine controller (PMC) 116 outputs a signal through an I/O unit 117 to an auxiliary device (such as an automatic tool change device) of a machine tool to control the auxiliary device by following a sequence program provided in the numerical controller 100. The PMC 116 accepts signals input through various switches and the like of an operator's panel arranged at the body of the machine tool, executes necessary signal processing, and transfers the processed signals to the CPU 111. Generally, the PMC 116 is also called a programmable logic controller (PLC). The operator's panel 171 is connected to the PMC 116. The operator's panel 171 may include a manual pulse generator, for example. The display/MDT unit 170 is a manual data input unit with a display, a keyboard, etc. An interface 118 is used for transmitting screen data to be displayed to the display of the display/MDI unit 170. The interface 118 is also used for receiving a command and data from the keyboard of the display/MDI unit 170 and transferring the received command and data to the CPU 111.

An axis control circuit 130, an axis control circuit 131, an axis control circuit 132, an axis control circuit 133, and an axis control circuit 134 of corresponding axes receive movement commands of the corresponding axes given from the CPU 111, and output the commands on the corresponding axes to a servo amplifier 140, a servo amplifier 141, a servo amplifier 142, a servo amplifier 143, and a servo amplifier 144 respectively. In response to receipt of these commands, the servo amplifiers 140 to 144 drive a servo motor 150, a servo motor 151, a servo motor 152, a servo motor 153, and a servo motor 154 of the corresponding axes respectively. The servo motors 150 to 154 of the corresponding axes each include a built-in position and speed detector. The servo motors 150 to 154 transmit position and speed feedback signals from their position and speed detectors as feedbacks to the axis control circuits 130 to 134 respectively, thereby exerting position and speed feedback control. The illustration of the position and speed feedback is omitted from the block diagram shown in FIG. 2.

A spindle control circuit 160 outputs a spindle speed signal to a spindle amplifier 161 in response to receipt of a spindle rotation command directed to the machine tool. In response to receipt of the spindle speed signal, the spindle amplifier 161 rotates a spindle motor 162 of the machine tool at a rotation speed designated in the command, thereby driving a tool. A pulse encoder 16$i$ is coupled to the spindle motor 162 with a gear or a belt, for example. The pulse encoder 163 outputs a feedback pulse in synchronization with the rotation of a spindle. The feedback pulse passes through the bus 120 to be read by the CPU 111.

Referring back to FIG. 1, the automatic backup device 200 is configured as an information processing device (a personal computer (PC) or a server computer, for example) having a function as a server. The automatic backup device 200 stores a history of a change in a parameter or in a program transmitted from each numerical controller 100 in association with this numerical controller 100. According to the present embodiment, the automatic backup device 200 stores a backup containing a parameter and a program of the numerical controller 100 entirely and a change history indicating a difference from the backup. The automatic backup device 200 accumulates and stores change histories transmitted from each numerical controller 100. The automatic backup device 200 generates and stores a newest backup at regular time intervals (once every day, for example) by using a most recent backup and the accumulated and stored change histories. In the below, a backup and a change history will collectively be called "history information."

If a restoration request is received from the numerical controller 100, the automatic backup device 200 identifies history information for restoring the numerical controller 100 to a state as of a designated date and time, and transmits the identified history information to the numerical controller 100. According to the present invention, if the restoration request is received, the automatic backup device 200 identifies a most recent backup before the designated date and time. Then, the automatic backup device 200 applies change histories sequentially in chronological order, ranging from a date and time of the most recent backup to the designated date and time, to the most recent backup. In this way, the automatic backup device 200 generates a backup as of the designated date and time (hereinafter called a "restoration backup"). To restore the numerical controller 100 to a state as of the designated date and time, the automatic backup device 200 transmits the generated restoration backup to the numerical controller 100. In this way, the numerical controller 100 can be restored to the state as of the designated date and time.

Figure 3:
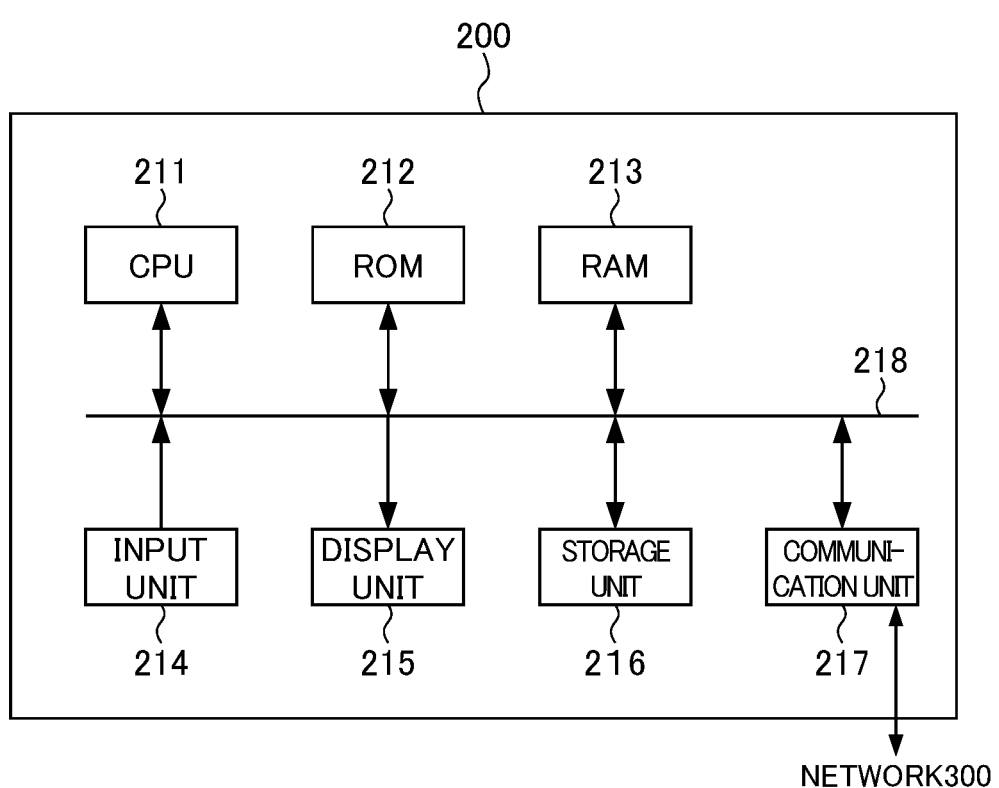
FIG. 3 is a block diagram showing the hardware configuration of an automatic backup device.

FIG. 3 is a block diagram showing the hardware configuration of the automatic backup device 200. The automatic backup device 200 includes a CPU 211 as a processor that controls the automatic backup device 200 entirely. The CPU 211 reads various programs from a storage unit 216 through a bus 218 and executes the read programs, thereby controlling the automatic backup device 200 entirely. A ROM 212 stores various system programs written in advance for controlling the automatic backup device 200. A RAM 213 is formed of semiconductor memory such as a dynamic random access memory (DRAM). The RAM 213 stores data generated during execution of various types of processing by the CPU 211. Generally, access is made faster to a RAM than to a ROM. Thus, the system programs stored in the ROM 212 may be developed in advance on the RAM 213. Then, the CPU 211 may read the system programs from the RAM 213 and execute the read system programs.

An input unit 214 is formed of an input unit such as a keyboard, a mouse, a touch panel, or a microphone, for example. The input unit 214 accepts input of various types of information to the automatic backup device 200. A display unit 215 is formed of a display unit such as a liquid crystal display (LCD), a cathode ray tube (CRT), an organic EL display, or a light-emitting diode (LED) display. The display unit 215 displays results of various types of processing by the automatic backup device 200. The results may be given not only by means of visual representation but also by means of audio output through a speaker. The storage unit 216 is formed of a nonvolatile storage unit such as a hard disk or a flash memory. The storage unit 215 stores various programs for execution of various types of processing by the automatic backup device 200, data such as history information about the numerical controller 100, etc. A communication unit 217 includes a communication interface such as a local area network (LAN) or a universal serial bus (USE), for example, for executing communication processing based on a predetermined communication standard. The communication unit 217 controls communication of the automatic backup device 200 with an external device.

Figure 4:
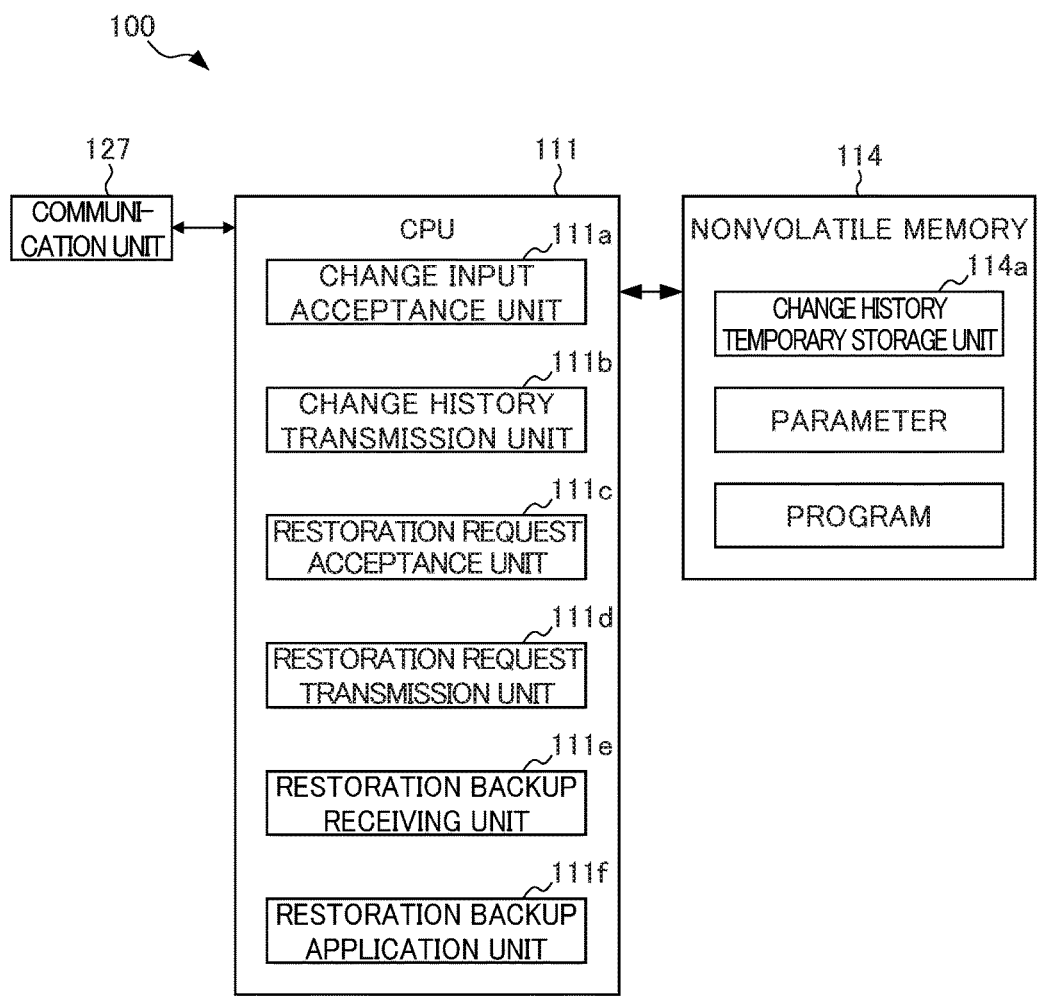
FIG. 4 is a functional block diagram showing the functional configuration of the numerical controller.

Execution of various programs in the numerical controller 100 and the automatic backup device 200 having the above-described hardware configurations realizes functional configurations as follows in the automatic backup system 1. FIG. 4 is a functional block diagram showing the functional configuration of the numerical controller 100. As shown in FIG. 4, the CPU 111 of the numerical controller 100 executes programs for change history acquisition processing and restoration execution processing, thereby forming the following functional units in the CPU 111: a change input acceptance unit 111a, a change history transmission unit 111b, a restoration request acceptance unit 111c, a restoration request transmission unit 111d, a restoration backup receiving unit 111e, and a restoration backup application unit 111f. Further, a change history temporary storage unit 114a is formed in the nonvolatile memory 114. The change history temporary storage unit 114a may alternatively be formed in a storage region of a different storage unit such as the RAM 113.

The change input acceptance unit 111a accepts change in a parameter of a program of the numerical controller 100 input through the display/MDI unit 170. The change input acceptance unit 111a sets the parameter or the program by following the input content of the change in the parameter or in the program, and stores the content of the change as a change history into the change history temporary storage unit 114a. At this time, the change input acceptance unit 111a incorporates a date and time of the change, a location of the change, a value before the change, and a value after the change about the input content of the change into the change history, and stores the change history into the change history temporary storage unit 114a.

The change history transmission unit 111b transmits a change history stored in the change history temporary storage unit 114a through the network 300 to the automatic backup device 200 at predetermined regular time intervals (once every second, for example). The restoration request acceptance unit 111c accepts a restoration request to restore the numerical controller 100 input through the display/MDI unit 170. As described above, the restoration request contains designation of a date and time to when the numerical controller 100 is to be restored.

The restoration request transmission unit 111d transmits the restoration request accepted by the restoration request acceptance unit 111c to the automatic backup device 200 through the network 300. The restoration backup receiving unit 111e receives a restoration backup the automatic backup device 200 has transmitted in response to the restoration request transmitted from the numerical controller 100 to the automatic backup device 200. The restoration backup application unit 111f sets the state of the parameter and that of the program based on the restoration backup received by the restoration backup receiving unit 111e. More specifically, the restoration backup contains a backed-up content of the parameter and a backed-up content of the program in a state as of the date and time designated in the restoration request. The restoration backup application unit 111f sets the numerical controller 100 at a state with the parameter and the program of these contents. As a result, the numerical controller 100 is restored to the state as of the designated date and time.

Figure 5:
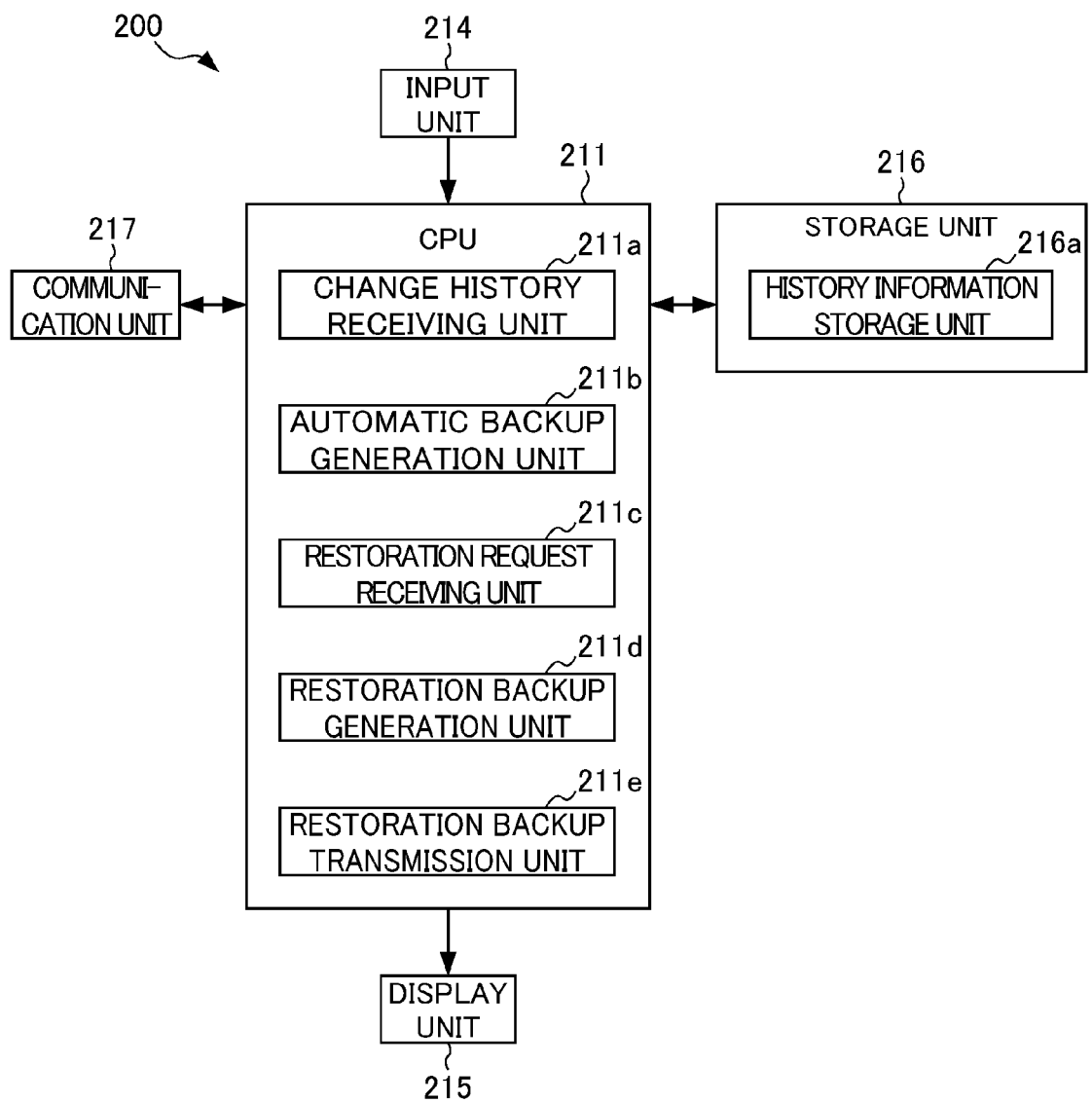
FIG. 5 is a functional block diagram showing the functional configuration of the automatic backup device.

The functional configuration of the automatic backup device 200 will be described next. FIG. 5 is a functional block diagram showing the functional configuration of the automatic backup device 200. As shown in FIG. 5, the CPU 211 of the automatic backup device 200 executes programs for backup processing and restoration assistance processing, thereby forming the following functional units in the CPU 211: a change history receiving unit 211a, an automatic backup generation unit 211b, a restoration request receiving unit 211c, a restoration backup generation unit 211d, and a restoration backup transmission unit 211e. Further, a history information storage unit 216a is formed in the storage unit 216. The history information storage unit 216a may alternatively be formed in a storage region of a different storage unit such as the RAM 213. All the functions of the automatic backup device 200 can be implemented in a distributed manner in multiple devices. For example, the history information storage unit 216a can be implemented in a database server allowed to communicate with the automatic backup device 200 through the network 300.

The change history receiving unit 211a receives change histories through the network 300 transmitted from the numerical controller 100 at regular time intervals. The change history receiving unit 211a accumulates the received change histories and stores the accumulated change histories into the history information storage unit 216a. The automatic backup generation unit 211b generates a newest backup at regular time intervals (once every day, for example) by using a most recent backup stored in the history information storage unit 216a and the change histories accumulated and stored in the history information storage unit 216a, and stores the generated newest backup into the history information storage unit 216a. At this time, the automatic backup generation unit 211b applies the change histories sequentially in chronological order, accumulated and stored in the history information storage unit 216a and ranging to a newest change history, to the most recent backup stored in the history information storage unit 216a. As a result, a newest backup is generated containing the history information entirely about the numerical controller 100 held by the automatic backup device 200. As described above, by generating a newest backup at predetermined regular time intervals, history information as a starting point of restoration of the numerical controller 100 can be held appropriately.

FIG. 6 is a schematic view showing an example of history information stored in the history information storage unit 216a. As shown in FIG. 6, the history information storage unit 216a stores a backup (Backup) containing a parameter and a program of the numerical controller 100 entirely and various change histories indicating differences from the backup. The history information storage unit 216a stores a date and time of history information, a location of a change, a value before the change, and a value after the change in association with each other. For example, a first row of the history information shown in FIG. 6 contains information about a backup including a date and time of the history information "2016/01/01 00:00:00.00," a location of a change "Backup," and a value before the change and a value after the change "State as of the time of shipment." The first row of the history information indicates the content of the backup as of the time of shipment of the numerical controller 100. Storing the content of the backup as of the time of shipment allows resetting of the numerical controller 100, for example. A value before a change and a value after the change are the same in a backup. A seventh row of the change history information shown in FIG. 6 contains information about a change history including a date and time of the history information "2016/06/01 09:53:11.46," a location of a change "Parameter #12345," a value before the change "67," and a value after the change "89." The seventh row of the history information shows the content of the change history indicating that a value of "Parameter #12345" was changed from "67" to "89" on the date and time "2016/06/01 09:53:11.46."

Referring back to FIG. 5, the restoration request receiving unit 211c receives a restoration request through the network 300 transmitted from the numerical controller 100. The restoration backup generation unit 211d generates a restoration backup for the numerical controller 100 based on the restoration request received by the restoration request receiving unit 211c. More specifically, the restoration backup generation unit 211d refers to the history information storage unit 216a to identify a most recent backup before a date and time designated in the restoration request. Then, by using the identified backup as a starting point, the restoration backup generation unit 211d applies change histories sequentially in chronological order belonging to change histories accumulated and stored in the history information storage unit 216a and ranging from a date and time of the identified backup to the date and time designated in the restoration request. As a result, a restoration backup is generated indicating the state of the numerical controller 100 as of the date and time designated in the restoration request. The restoration backup transmission unit 211e transmits the restoration backup generated by the restoration backup generation unit 211d to the numerical controller 100 having transmitted the restoration request.

[Operation]

The operation of the automatic backup system 1 will be described next.

[Change History Acquisition Processing]

FIG. 7 is a flowchart showing a flow of the change history acquisition processing executed by the CPU 111 of the numerical controller 100. The change history acquisition processing starts together with start of the operation of the numerical controller 100. In step S11, the change input acceptance unit 111a determines whether or not a change in a parameter or in a program of the numerical controller 100 has been input through the display/MDI unit 170, the interface 115, or the communication unit 127.

If it is determined that a change in a parameter or in a program of the numerical controller 100 has been input through the display/MDI unit 170, the interface 115, or the communication unit 127 (step S11: YES), the processing shifts to step S12. If it is determined that a change in a parameter or in a program of the numerical controller 100 has not been input through the display/MDI unit 170, the interface 115, or the communication unit 127 (step S11: NO), the processing shifts to step S13. In step S12, the change input acceptance unit 111a stores the input content of the change in the parameter or in the program as a change history into the change history temporary storage unit 114a.

In step S13, the change history transmission unit 111b determines whether or not a predetermined time interval (one second, for example) has elapsed. If it is determined that the predetermined time interval (one second, for example) has elapsed (step S13: YES), the processing shifts to step S14. If it is determined that the predetermined time interval (one second, for example) has not elapsed, the change history acquisition processing is repeated. In step S14, the change history transmission unit 111b transmits the change history stored in the change history temporary storage unit 114a through the network 300 to the automatic backup device 200. After step S14, the change history acquisition processing is repeated.

[Backup Processing]

Figure 8:
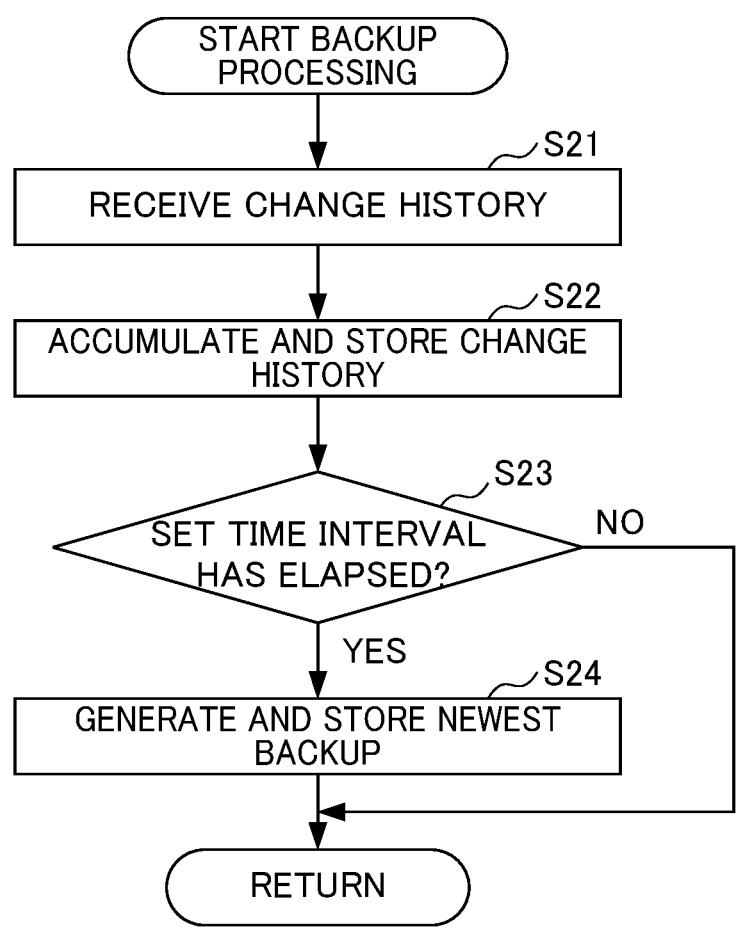
FIG. 8 is a flowchart showing a flow of a backup processing executed by a CPU of the automatic backup device.

FIG. 8 is a flowchart showing a flow of the backup processing executed by the CPU 211 of the automatic backup device 200. The backup processing starts in response to a command given to the automatic backup device 200 to start the backup processing. In step S21, the change history receiving unit 211a receives change histories through the network 300 transmitted from the numerical controller 100 at regular time intervals. In step S22, the change history receiving unit 211a accumulates the received change histories and stores the accumulated change histories into the history information storage unit 216a.

In step S23, the automatic backup generation unit 211b determines whether or not a predetermined time interval (one day, for example) has elapsed. If it is determined that the predetermined time interval (one day, for example) has elapsed (step S23: YES), the processing shifts to step S24. If it is determined that the predetermined time interval (one day, for example) has not elapsed (step S23: NO), the backup processing is repeated. In step S24, the automatic backup generation unit 211b generates a newest backup by using a most recent backup stored in the history information storage unit 216a and the change histories accumulated and stored in the history information storage unit 216a. Then, the automatic backup generation unit 211b stores the newest backup into the history information storage unit 216a. After step S24, the backup processing is repeated.

[Restoration Assistance Processing]

FIG. 9 is a flowchart showing a flow of the restoration assistance processing executed by the CPU 211 of the automatic backup device 200. The restoration assistance processing starts in response to a command given to the automatic backup device 200 to start the restoration assistance processing. In step S31, the restoration request receiving unit 211c determines whether or not a restoration request transmitted from the numerical controller 100 has been received through the network 300. If it is determined that a restoration request transmitted from the numerical controller 100 has been received through the network 300 (step S31: YES), the processing shifts to step S32. If it is determined that a restoration request transmitted from the numerical controller 100 has not been received through the network 300 (step S31: NO), the restoration assistance processing is repeated. In step S32, the restoration backup generation unit 211d refers to the history information storage unit 216a to identify a most recent backup before a date and time designated in the restoration request.

FIG. 10 is a schematic view showing an example of a state where the date and time is designated in the restoration request. In the history information shown in FIG. 10, the designated date and time is one immediately before a change history in a sixth row (a change history generated by erroneous deletion of a program). FIG. 11 is a schematic view showing an example of a state where a backup is identified by the restoration assistance processing. A backup to be identified is a most recent backup before the designated date and time. Thus, if the date and time immediately before the change history in the sixth row shown in FIG. 10 is designated in the restoration request, a backup in a first row is identified, as shown in FIG. 11. In step S33, the restoration backup generation unit 211d applies change histories sequentially in chronological order, belonging to change histories accumulated and stored in the history information storage unit 216a and ranging from a date and time of the identified backup to the date and time designated in the restoration request, to the identified backup.

FIG. 12 is a schematic view showing a state where restoration is made to the date and time designated in the restoration request. As shown in FIG. 12, as a result of execution of step S33, change histories in rows from a second row to a fifth row, ranging from the date and time of the identified backup shown in FIG. 11 to the date and time designated in the restoration request, are applied in chronological order to the backup in the first row. In step S34, the restoration backup generation unit 211d generates a restoration backup by using a result obtained by applying the change histories in step S33. In step S35, the restoration backup transmission unit 211e transmits the generated restoration backup to the numerical controller 100 having transmitted the restoration request. After step S35, the restoration assistance processing is repeated.

[Restoration Execution Processing]

Figure 13:
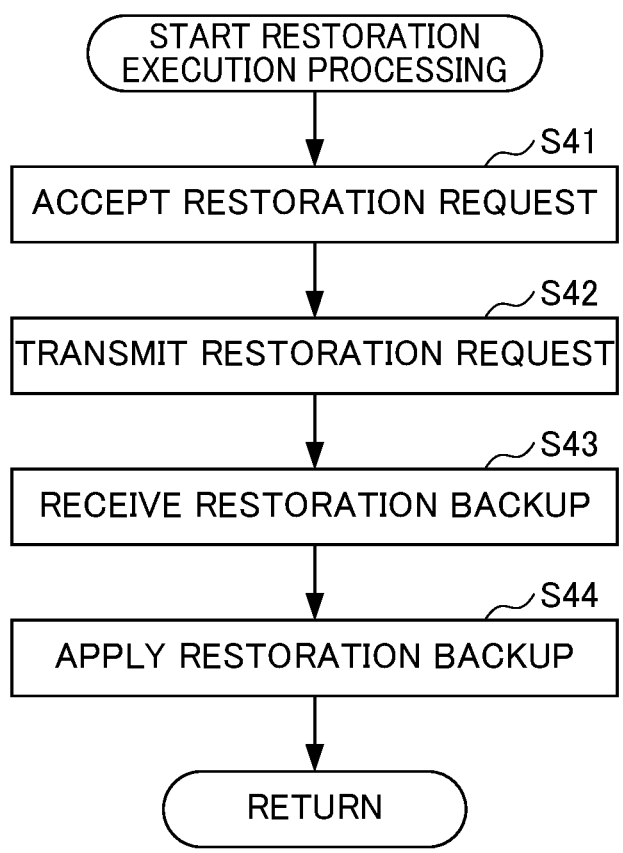
FIG. 13 is a flowchart showing a flow of restoration execution processing executed by the CPU of the numerical controller.

FIG. 13 is a flowchart showing a flow of the restoration execution processing executed by the CPU 111 of the numerical controller 100. The restoration execution processing starts in response to a command given to the numerical controller 100 to start the restoration execution processing. In step S41, the restoration request acceptance unit 111c accepts input of a restoration request to restore the numerical controller 100 through the display/MDI unit 170, the interface 115, or the communication unit 127.

In step S42, the restoration request transmission unit 111d transmits the restoration request accepted by the restoration request acceptance unit 111c to the automatic backup device 200 through the network 300. This restoration request contains designation of a date and time to when the numerical controller 100 is to be restored.

In step S43, the restoration backup receiving unit 111e receives a restoration backup the automatic backup device 200 has transmitted in response to the restoration request transmitted from the numerical controller 100 to the automatic backup device 200. In step S44, the restoration backup application unit 111f sets the state of a parameter and that of a program based on the received restoration backup.

As a result of the above-described processing, the numerical controller 100 is restored to the state as of the date and time designated in the restoration request.

In the above-described embodiment, regarding generation of a backup by the automatic backup device 200, a real backup may be acquired to conform to any timing responsive to an operator's command in addition to generating a backup at regular time intervals. If the real backup is acquired, an automatic backup is generated thereafter using the acquired real backup as a starting point.

In the above-described embodiment, regarding timing of generation of a backup by the automatic backup device 200, a backup may be generated each time change histories of given quantities are accumulated in addition to generating a backup at regular time intervals. Likewise, regarding timing of transmission of a change history from the numerical controller 100 to the automatic backup device 200, a change history may be transmitted each time change histories of given quantities are stored temporarily in addition to transmitting a change history at regular time intervals. By doing so, timing of generation of a backup by the automatic backup device 200 and timing of transmission of a change history from the numerical controller 100 can be responsive to the quantity of information about change histories that is to be changed by the frequency of making of changes, for example. In the above-described embodiment, additive information such as the name of a person having made a change may be added as reference information to a change history. This allows more proper restoration of a target device while allowing for more specific conditions.

[First Modification]

In the above-described embodiment, the restoration backup generation unit 211d identifies a most recent backup before a date and time designated in a restoration request. By using the identified backup as a starting point, the restoration backup generation unit 211d applies change histories sequentially in chronological order belonging to change histories accumulated and stored in the history information storage unit 216a and ranging from a date and time of the identified backup to the date and time designated in the restoration request. By contrast, the restoration backup generation unit 211d may identify a most recent backup after a date and time designated in a restoration request. By using the identified backup as a starting point, the restoration backup generation unit 211d may recover change histories sequentially in reverse chronological order to their states before being changed. The recovered change histories range from a date and time of the identified backup to the date and time designated in the restoration request. FIG. 14 schematically shows a procedure of generating a restoration backup by identifying a most recent backup after a date and time designated in a restoration request. As shown in FIG. 14, a restoration backup can also be generated by using the most recent backup after the date and time designated in the restoration request. Meanwhile, both of the following procedures can be taken: a procedure according to the above-described embodiment of generating a restoration backup by using a most recent backup before a date and time designated in a restoration request; and a procedure shown in FIG. 14 of generating a restoration backup by using a most recent backup after the date and time designated in the restoration request. If the restoration backups generated by taking these procedures do not have the same content, the following options (1) to (3) can be taken: (1) to use either of the restoration backups; (2) to use an available one of the restoration backups; and (3) to stop restoration to the designated date and time. Any of these options may be taken in response to acceptance of operator's input. With this configuration, a device can be restored as long as a restoration backup can be generated by taking at least one of the foregoing procedures. Additionally, an operator is allowed to select the necessity of execution of device restoration according to circumstances.

[Second Modification]

In the above-described embodiment, if a contradiction is detected in history information stored in the history information storage unit 216a, an alert notifying the contradiction may be transmitted to the numerical controller 100 and displayed on the numerical controller 100. Further, a change history to be interpolated for resolving the contradiction may be generated. The processing of interpolation for resolving the contradiction in the history information can be executed by the change history receiving unit 211a, the automatic backup generation unit 211b, or the restoration backup generation unit 211d, for example. For example, the processing of interpolation for resolving the contradiction in the history information can be executed to conform to timing of receipt of the history information by the change history receiving unit 211a from the numerical controller 100, timing of generation of a newest backup by the automatic backup generation unit 211b, or timing of generation of a restoration backup by the restoration backup generation unit 211d. FIG. 15 schematically shows a state where there is a contradiction in the history information stored in the history information storage unit 216a. FIG. 16 is a schematic view showing a state where a change history for resolving the contradiction is interpolated. In the state shown in FIG. 15, a contradiction exists between a thirteenth row (last row) of the history information and a change history newly received from the numerical controller 100. More specifically, "Value after change" in the thirteenth row of the history information and "Value before change" in the change history newly received from the numerical controller 100 do not match and show different values, "6535" and "8949" respectively. However, these values indicate changes relating to the same parameter "Parameter #314" and should match each other correspondingly. This is considered to be caused for the reason that a change history, which should originally be present between the change history in the thirteenth row of the history information storage unit 216a and the change history newly received from the numerical controller 100, has been lost for some reason. As shown in FIG. 16, in response to the occurrence of the above-described contradiction, an interpolating change history may be generated containing "Value before change" brought from "Value after change" in the change history as of the older date and time, while containing "Value after change" brought from "Value before change" in the change history as of the newer date and time. Then, the generated interpolating change history may be interpolated between the two contradicting change histories. A date and time of the interpolating change history may be a date and time between the two contradicting change histories designated automatically by the automatic backup device 200, or may be a date and time determined by accepting designation by an operator of the numerical controller 100, for example. According to the present embodiment, the interpolating change history generated in this way is stored into the history information storage unit 216a with an indication that the stored change history is for interpolation. As a result, even if there is a contradiction in history information, the numerical controller 100 can be restored more reliably. In response to detection of a contradiction in history information stored in the history information storage unit 216a, a choice to designate a different date and time and to make a restoration request may be offered to an operator of the numerical controller 100 in addition to generating an interpolating change history.

[Third Modification]

In the example given the above-described embodiment, a restoration backup is generated by the automatic backup device 200. By contrast, part of the processing of generating a restoration backup may be executed by the numerical controller 100. If a date and time designated in a restoration request is close to a current time, for example, a most recent backup after the designated date and time and a change history may be transmitted from the automatic backup device 200. By doing so, a restoration backup can be generated by the numerical controller 100. At this time, a change history stored temporarily in the numerical controller 100 may be held in the numerical controller 100 without being transmitted to the automatic backup device 200. This change history may be used for generation of the restoration backup together with the backup and the change history received from the automatic backup device 200.

[Fourth Modification]

In the above-described embodiment, when the restoration backup application unit 111f sets a state of a parameter and that of a program of the numerical controller 100 based on a restoration backup, states after the setting may be displayed on a screen of the numerical controller 100. Then, an operator may be asked to determine the necessity to make the setting. Likewise, a state of a parameter and that of a program of the numerical controller 100 may be set provisionally and states after the setting may be simulated. Then, the operator may be asked to determine the necessity to make the setting. As a result, the operator is allowed to determine in advance whether or not restoration can be made properly in response to a restoration request.

[Fifth Modification]

In the above-described embodiment, when the change history receiving unit 211a of the automatic backup device 200 stores received history information into the history information storage unit 216a, the change history receiving unit 211a may add a label to a backup and a change history in the history information. FIG. 17 is a schematic view showing a state where a label is added to history information. Referring to FIG. 17, a label "Program editing" is added as a change history in a second row of the history information. This [Label] named as [Program editing] shows timing of making of a change relating to program editing shown in rows from a third row to a ninth row of the history information. A label [System software update] is added as a change history in a tenth row of the history information. This [Label] named as [System software update] shows timing of making of a change relating to system software update shown in rows from an eleventh row to a thirteenth row of the history information. Each of these labels can be added to a change history to which the numerical controller 100 is to be restored frequently or to a change history to which the numerical controller 100 can be restored reliably. Adding a label to a change history makes it possible to designate a change history intended for restoration more easily than designating a date and time.

[Sixth Modification]

The above-described embodiment may have an additional function of applying a change to the numerical controller 100. The applied change has the same content as that of a change history as of a particular date and time belonging to history information stored in the automatic backup device 200. FIG. 18 is a schematic view showing a state where a change having the same content as that of a change history as of a particular date and time is applied to the numerical controller 100. The state shown in FIG. 18 corresponds to the state of the history information shown in FIG. 12. The state shown in FIG. 18 is formed as follows. After the numerical controller 100 is restored to a state before a change history in a sixth row belonging to the history information stored in the automatic backup device 200 is made, the change input acceptance unit 111a accepts designation of change histories in rows after the sixth row from a seventh row to a thirteenth row. Then, changes of the same content (setting of a parameter or that of a program) are applied again. This configuration facilitates making of a change having the same content as a change to be made repeatedly, for example.

[Seventh Modification]

The above-described embodiment may have an additional function of applying a change for canceling only a particular change history. More specifically, a particular change history can be canceled by adding and applying a change having a reverse content to that of the particular change history to the numerical controller 100. FIG. 19 is a schematic view showing a state where a change for canceling only a particular change history is applied. The state shown in FIG. 19 corresponds to the state of the history information shown in FIG. 10. As shown in FIG. 19, a change history indicating deletion of "User program O0102 entirely" in a sixth row of the history information can be canceled by applying a change of adding "User program O0102 entirely" as a change history shown the last row, for example. The processing of adding and applying a change having a reverse content to that of the particular change history may be executed automatically by the restoration backup generation unit 211d of the automatic backup device 200, or may be executed in response to acceptance of operator's input by the change input acceptance unit 111a of the numerical controller 100. As described above, being capable of restoring the numerical controller 100 properly by applying a reverse content to that of a particular change history means that the numerical controller 100 can be restored by simple processing.

[Eighth Modification]

Figure 20:
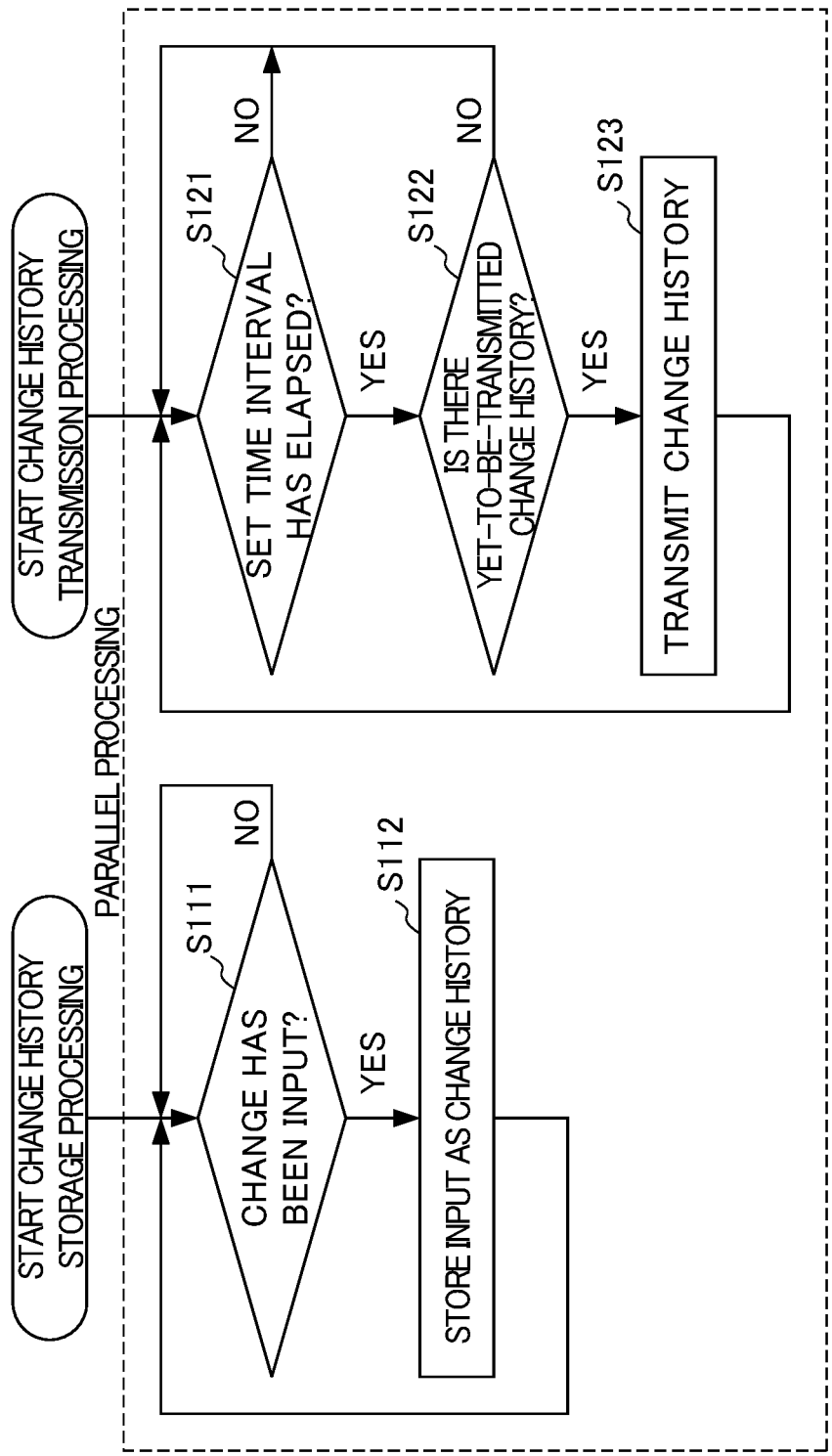
FIG. 20 is a flowchart showing a flow of a procedure employed to execute processing of storing a change history (change history storage processing) and processing of transmitting the change history (change history transmission processing) in parallel.

In the above-described embodiment, the change history acquisition processing shown. In FIG. 7 can be executed as parallel processing described below. FIG. 20 is a flowchart showing a flow of a procedure employed to execute processing of storing a change history (change history storage processing) and processing of transmitting the change history (change history transmission processing) in parallel. In the example shown in FIG. 20, the change history acquisition processing shown in FIG. 7 is divided into the change history storage processing and the change history transmission processing. The change history storage processing and the change history transmission processing are executed in parallel together with start of the operation of the numerical controller 100. In step S111 of the change history storage processing, the change input acceptance unit 111a determines whether or not a change in a parameter or in a program of the numerical controller 100 has been input through the display/MDI unit 170, the interface 115, or the communication unit 127. If it is determined that a change in a parameter or in a program of the numerical controller 100 has been input through the display/MDI unit 170, the interface 115, or the communication unit 127 (step S111: YES), the processing shifts to step S112. If it is determined that a change in a parameter or in a program of the numerical controller 100 has not been input through the display/MDI unit 170, the interface 115, or the communication unit 127 (step S111: NO), step S111 is repeated. In step S112, the change input acceptance unit 111a stores the input content of the change in the parameter or in the program as a change history into the change history temporary storage unit 114a. After step S112, the change history storage processing is repeated. In step S121 of the change history transmission processing, the change history transmission unit 111b determines whether or not a predetermined time interval (one second, for example) has elapsed. If it is determined that the predetermined time interval (one second, for example) has elapsed (step S121: YES), the processing shifts to step S122. If it is determined that the predetermined time interval (one second, for example) has not elapsed (step S121: NO), step S121 is repeated. In step S122, the change history transmission unit 111b determines whether or not there is a yet-to-be-transmitted change history in the change history temporary storage unit 114a. If it is determined that there is a yet-to-be-transmitted change history in the change history temporary storage unit 114a (step S122: YES), the processing shifts to step S123. If it is determined that there is no yet-to-be-transmitted change history in the change history temporary storage unit 114a (step S122: NO), the processing shifts to step S121. In step S123, the change history transmission unit 111b transmits the change history stored in the change history temporary storage unit 114a to the automatic backup device 200 through the network 300. After step S123, the change history transmission processing is repeated.

[Ninth Modification]

In the above-described embodiment, the backup processing shown in FIG. 8 can be executed as parallel processing described below. FIG. 21 is a flowchart showing a flow of a procedure employed to execute processing of accumulating change histories (change history accumulation processing) and processing of generating a backup (backup generation processing) in parallel. In the example shown in FIG. 21, the backup processing shown in FIG. 8 is divided into the change history accumulation processing and the backup generation processing. The change history accumulation processing and the backup generation processing are executed in parallel in response to a command given to the automatic backup device 200 to execute the change history accumulation processing and the backup generation processing. In step S211 of the change history accumulation processing, the change history receiving unit 211a determines whether or not a change history has been received from the numerical controller 100 through the network 300. If it is determined that a change history has been received from the numerical controller 100 through the network 300 (step S211: YES), the processing shifts to step S212. If it is determined that a change history has not been received from the numerical controller 100 through the network 300 (step S211: NO), step S211 is repeated. In step S212, the change history receiving unit 211a accumulates received change histories and stores the accumulated change histories into the history information storage unit 216a. After step S212, the change history accumulation processing is repeated. In step S221 of the backup generation processing, the automatic backup generation unit 211b determines whether or not a predetermined time interval (one day, for example) has elapsed. If it is determined that the predetermined time interval (one day, for example) has elapsed (step S221: YES), the processing shifts to step S222. If it is determined that the predetermined time interval (one day, for example) has not elapsed (step S221: NO), step S221 is repeated. In step S222, the automatic backup generation unit 211b determines whether or not a change history has been received newly. Specifically, in step S222, the automatic backup generation unit 211b determines whether or not history information has been accumulated newly into the history information storage unit 216a. If it is determined that a change history has been received newly (step S222: YES), the processing shifts to step S223. If it is determined that a change history has not been received newly (step S222: NO), the processing shifts to step S221. In step S223, the automatic backup generation unit 211b generates a newest backup by using a most recent backup stored in the history information storage unit 216a and the change history newly accumulated in the history information storage unit 216a, and stores the generated newest backup into the history information storage unit 216a. After step S223, the backup generation processing is repeated.

The function of the automatic backup system 1 according to the above-described embodiment can be realized entirely or partially by hardware, by software, or by a combination of hardware and software. Being realized by software means being realized by execution of a program by a processor. To configure the automatic backup system 1 by hardware, the function of the automatic backup system 1 can be configured partially or entirely by using an integrated circuit (IC) such as an application specific integrated circuit (ASIC), a gate array, a field-programmable gate array (FPGA), or a complex programmable logic device (CPLD), for example.

The function of the automatic backup system 1 can also be configured entirely or partially by software in a computer including a storage unit such as a hard disk or a ROM storing programs describing all or part of the operation of the automatic backup system 1, a DRAM storing data required for calculation, a CPU, and a bus for connection between the units. In this computer, the function of the automatic backup system 1 can be realized by storing information necessary for calculation into the DRAM and making the CPU execute the programs.

These programs can be stored in various types of computer-readable media and can be supplied to the computer. The computer-readable media include various types of tangible storage media. Examples of the computer-readable media include a magnetic recording medium (a flexible disk, magnetic tape, or a hard disk drive, for example), a magneto-optical recording medium (an magneto-optical disk, for example), a CD read-only memory (CD-ROM), a CD-R, a CD-R/W, and a semiconductor memory (a mask ROM, a programmable ROM (PROM), an erasable PROM (EPROM), a flash memory, or a random access memory (RAM), for example). These programs may be distributed by being downloaded onto a computer of a user through a network.

While the embodiment of the present invention has been described in detail above, this embodiment is merely a specific example employed for implementing the present invention. The technical scope of the present invention is not to be limited to the above-described embodiment. Various changes of the present invention can be devised without departing from the substance of the invention. These changes are also covered by the technical scope of the present invention.

EXPLANATION OF REFERENCE NUMERALS

1 Automatic backup system
100 Numerical controller
111, 211 CPU
111a Change input acceptance unit
111b Change history transmission unit
111c Restoration request acceptance unit
111d Restoration request transmission unit
111e Restoration backup receiving unit
111f Restoration backup application unit
211a Change history receiving unit
211b Automatic backup generation unit
211c Restoration request receiving unit
211d Restoration backup generation unit
211e Restoration backup transmission unit
112, 212 ROM
113, 213 RAM
114 Nonvolatile memory
114a Change history temporary storage unit
115, 118 Interface
116 Programmable machine controller (PMC)
117 I/O unit
120, 218 Bus
127, 217 Communication unit
130 to 134 Axis control circuit
140 to 144 Servo amplifier
150 to 154 Servo motor
160 Spindle control circuit
161 Spindle amplifier
162 Spindle motor
163 Pulse encoder
170 Display/MDI unit
171 Operator's panel
172 External equipment 200 Automatic backup device
214 Input unit
215 Display unit
216 Storage unit
216a History information storage unit
300 Network

What is claimed is:

1. An automatic backup device comprising:
   a history information acquisition unit that acquires history information containing a time of a change in setting on a backup target device and a content of the change associated with each other;
   a restoration request acquisition unit that acquires a restoration request containing a time intended for restoration of the backup target device;
   a restoration information generation unit that generates restoration information for restoring the backup target device based on the time contained in the restoration request by using the history information acquired by the history information acquisition unit; and
   a restoration information transmission unit that transmits the restoration information generated by the restoration information generation unit to the backup target device,
   wherein the history information includes first change history and second change history,
   wherein, when there is a contradiction between the first change history and the second change history, the restoration information generation unit further executes processing of generating third change history for resolving the contradiction, the third change history being generated by interpolating between the first change history and the second change history, and
   wherein the third change history resolves the contradiction by providing values that are intermediate to the first change history and the second change history.

2. The automatic backup device according to claim 1, comprising a backup generation unit that generates a backup containing a parameter and a program of the backup target device entirely based on the history information acquired by the history information acquisition unit, the backup being generated at predetermined time intervals or each time the history information of a predetermined quantity is accumulated.

3. The automatic backup device according to claim 1, wherein the restoration information generation unit generates a restoration backup as the restoration information based on the time contained in the restoration request by using the history information, the restoration backup containing a parameter and a program of the backup target device entirely as of the time contained in the restoration request.

4. The automatic backup device according to claim 1, wherein the restoration information generation unit generates the restoration information by using a piece of the history information as a starting point as a basis older than a piece of the history information as of the time contained in the restoration request, and by applying pieces of the history information sequentially in chronological order in terms of a change in the setting, the applied pieces of the history information ranging to the time contained in the restoration request.

5. The automatic backup device according to claim 1, wherein the restoration information generation unit generates the restoration information by using a piece of the history information as a starting point as a basis newer than a piece of the history information as of the time contained in the restoration request, and by recovering pieces of the history information sequentially in reverse chronological order in terms of a change in the setting to their states before being changed, the recovered pieces of the history information ranging to the time contained in the restoration request.

6. The automatic backup device according to claim 1, wherein the history information acquisition unit adds a label to the received history information for discrimination of the history information.

7. The automatic backup device according to claim 1, wherein if a particular change in the history information is to be canceled, the restoration information generation unit adds and applies a change having a reverse content to that of the particular change.

8. The automatic backup device according to claim 1, comprising a history information storage unit in which the history information acquired by the history information acquisition unit is accumulated and stored.

9. The automatic backup device according to claim 8, wherein the history information storage unit stores a backup containing a parameter and a program of the backup target device entirely as of time of shipment of the backup target device.

10. The automatic backup device according to claim 1, wherein, when there is a contradiction between the first change history and the second change history, the restoration information generation unit further executes processing of transmitting the occurrence of the contradiction to the backup target device.

11. An automatic backup method executed by a computer, the method comprising:
    a history information acquisition step of acquiring history information containing a time of a change in setting on a backup target device and a content of the change associated with each other;
    a restoration request acquisition step of acquiring a restoration request containing a time intended for restoration of the backup target device;
    a restoration information generation step of generating restoration information for restoring the backup target device based on the time contained in the restoration request by using the history information acquired by the history information acquisition step; and
    a restoration information transmission step of transmitting the restoration information generated by the restoration information generation step to the backup target device,
    wherein the history information includes first change history and second change history,
    wherein, when there is a contradiction between the first change history and the second change history, the restoration information generation step further comprises a step of generating third change history for resolving the contradiction, the third change history being generated by interpolating between the first change history and the second change history, and
    wherein the third change history resolves the contradiction by providing values that are intermediate to the first change history and the second change history.

12. The automatic backup method according to claim 11, wherein, when there is a contradiction between the first change history and the second change history, the restoration information generation step further comprises a step of transmitting the occurrence of the contradiction to the backup target device.

13. A non-transitory computer-readable recording medium storing a program that causes a computer to function as:

a history information acquisition unit that acquires history information containing a time of a change in setting on a backup target device and a content of the change associated with each other;

a restoration request acquisition unit that acquires a restoration request containing a time intended for restoration of the backup target device;

a restoration information generation unit that generates restoration information for restoring the backup target device based on the time contained in the restoration request by using the history information acquired by the history information acquisition function; and a restoration information transmission unit that transmits the restoration information generated by the restoration information generation function to the backup target device, wherein the history information includes first change history and second change history, wherein, when there is a contradiction between the first change history and the second change history, the restoration information generation unit further executes processing of generating third change history for resolving the contradiction, the third change history being generated by interpolating between the first change history and the second change history, and wherein the third change history resolves the contradiction by providing values that are intermediate to the first change history and the second change history.

14. The non-transitory computer-readable recording medium according to claim 13, wherein, when there is a contradiction between the first change history and the second change history, the restoration information generation unit further executes processing of transmitting the occurrence of the contradiction to the backup target device.

* * * * *